(12) United States Patent
Inoue et al.

(10) Patent No.: US 7,485,841 B2
(45) Date of Patent: Feb. 3, 2009

(54) MULTI-OPTICAL AXIS PHOTOELECTRIC SENSOR

(75) Inventors: Tetsu Inoue, Osaka (JP); Tsuyoshi Tagashira, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 12/018,839

(22) Filed: Jan. 24, 2008

(65) Prior Publication Data

US 2008/0179505 A1 Jul. 31, 2008

(30) Foreign Application Priority Data

Jan. 25, 2007 (JP) ............................. 2007-015006

(51) Int. Cl.
*G08B 13/18* (2006.01)
(52) U.S. Cl. ...................... 250/221; 340/556
(58) Field of Classification Search ................. 250/221; 340/555, 556, 557
See application file for complete search history.

(56) References Cited

U.S. PATENT DOCUMENTS

| | | | |
|---|---|---|---|
| 5,302,942 A | | 4/1994 | Blau |
| 5,424,532 A | * | 6/1995 | Occheto et al. ............. 250/221 |
| 5,596,310 A | * | 1/1997 | Itoh ............................ 340/331 |
| 6,414,603 B1 | | 7/2002 | Yamaguchi et al. |
| 6,894,623 B2 | * | 5/2005 | Hama et al. ............ 340/815.54 |
| 6,979,814 B2 | | 12/2005 | Kudo et al. |
| 7,122,782 B2 | | 10/2006 | Sakaguchi |
| 7,348,537 B2 | * | 3/2008 | Akagi et al. ................. 250/221 |
| 2003/0052254 A1 | | 3/2003 | Kudo et al. |
| 2003/0146373 A1 | | 8/2003 | Kudo et al. |
| 2003/0164447 A1 | | 9/2003 | Kudo et al. |
| 2005/0063114 A1 | | 3/2005 | Suhara et al. |

FOREIGN PATENT DOCUMENTS

JP 11345548 12/1999
JP 2003-218679 7/2003

OTHER PUBLICATIONS

U.S. Appl. No. 12/018,283, filed Jan. 23, 2008, Inoue et al.

* cited by examiner

*Primary Examiner*—Stephen Yam
(74) *Attorney, Agent, or Firm*—Kilyk & Bowersox, P.L.L.C.

(57) ABSTRACT

A multi-optical axis photoelectric sensor is describes having a first indicating portion disposed at each of the light emitting and receiving units comprising a plurality of first indicating elements being in the same row of each of the light emitting and receiving elements with no-interference to each of the light emitting and receiving elements, a second indicating portion disposed at one of the light emitting and receiving units and comprising a plurality of second indicating elements being out of the same row of one of the light emitting and receiving elements of the units having the second indicator portion with no-interference to one of the light emitting and receiving elements of the units having the second indicator portion and an indicating control portion for turning on the plurality of the first indicating elements of the first indicating portion to show the first and second rows of the units when the binary signal indicating the first status is outputted by the status output circuit and indicating a result of the diagnosis based on the diagnosis device with a predetermined turn-on pattern of the plurality of the second indicating elements of the second indicating portion when the malfunction is diagnosed by the diagnosis device.

20 Claims, 10 Drawing Sheets

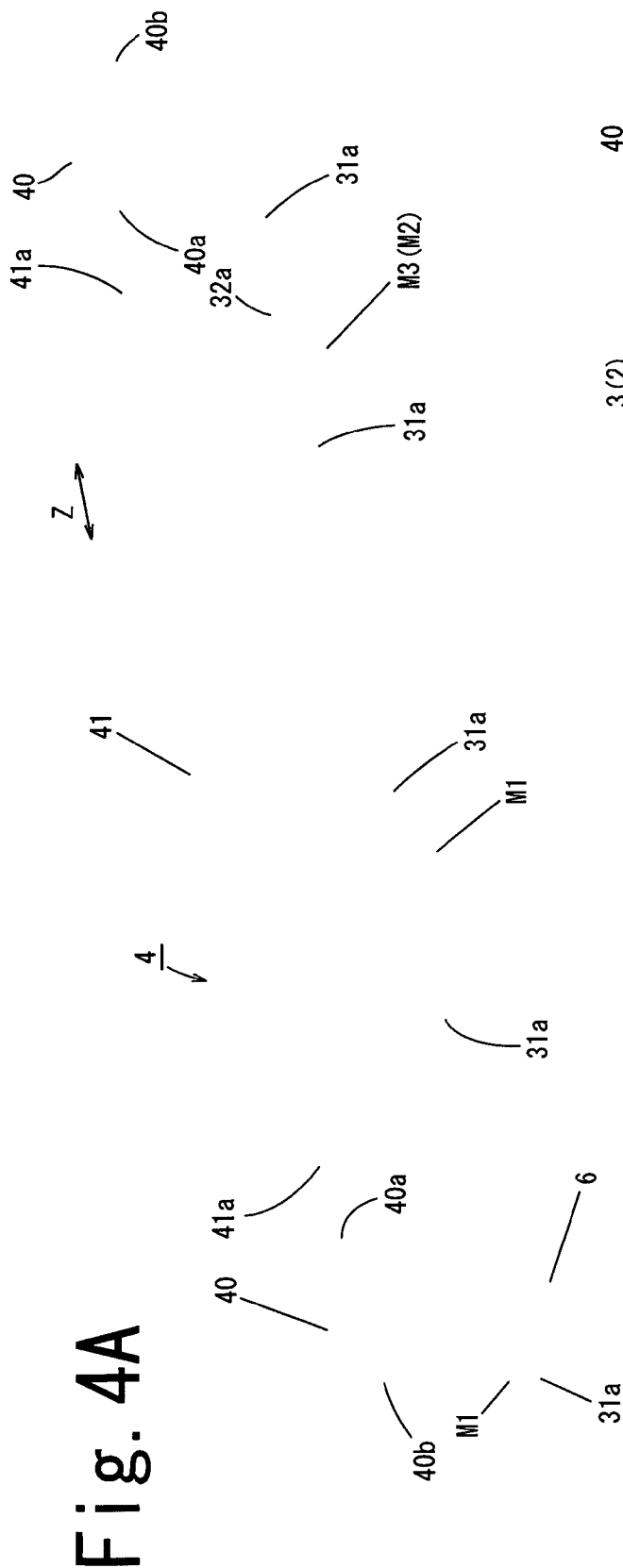
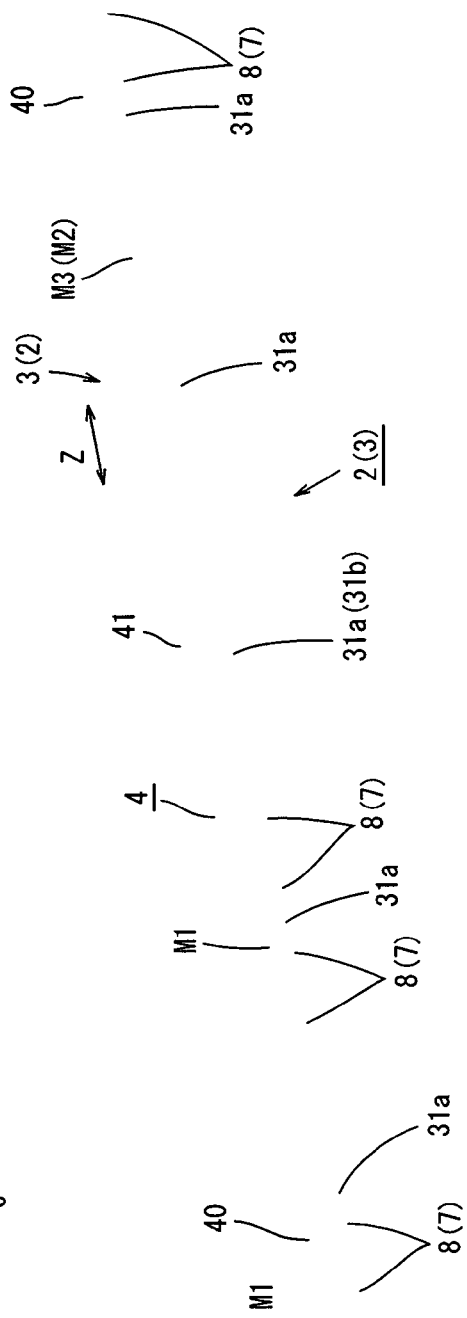
Fig. 4A
Fig. 4B

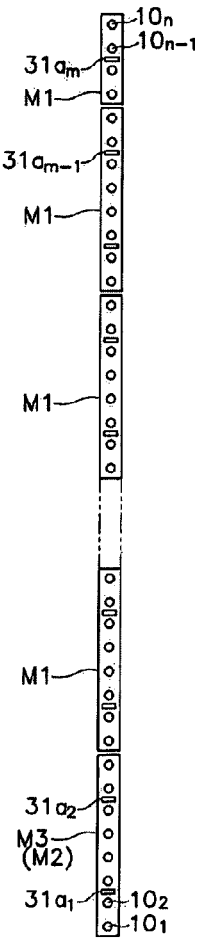

| | Turn off | Turn on with "red color" | Turn on with "green color" |
|---|---|---|---|
| Indicating element $31a_m$ | Optical axis $10_n$ is light block status. | Optical axis $10_n$ is light through status, and at least one of optical axes $10_1$ through $10_{n-1}$ is light block status. | All optical axes are light through status. |
| Indicating element $31a_{m-1}$ ⋮ Indicating element $31a_2$ | Optical axis $10_n$ or optical axis $10_1$ is light block status. | Both optical axes $10_1$ and $10_n$ are light through status, and at least one of optical axes $10_2$ through $10_{n-1}$ is light block status. | |
| Indicating element $31a_1$ | Optical axis $10_1$ is light block status. | Optical axis $10_1$ is light through status, and at least one of optical axes $10_2$ through $10_n$ is light block status. | |

MULTI-OPTICAL AXIS PHOTOELECTRIC SENSOR

CROSS-REFERENCE TO RELATED APPLICATION

The present application claims priority from Japanese Patent Application No. 2007-015006, filed on Jan. 25, 2007, the entire contents of which are hereby incorporated by reference.

BACKGROUND OF THE INVENTION

1. Field of the Invention

The present invention is related to a multi-optical axis photoelectric sensor configured by light emitting and receiving units each of which is formed by disposing a plurality of light emitting or receiving elements in a line to form a light curtain between them for detecting an object like a human body entering into the light curtain, and is especially related to an indicator installed into the multi-optical axis photoelectric sensor.

2. Description of the Related Art

To secure the safety of human being from a machine that is a hazardous source, like a press machine, a multi-optical axis photoelectric sensor is provided to the route where human being can enter into such a hazardous source.

A multi-optical axis photoelectric sensor has a light emitting unit having a plurality of light emitting elements disposed along a longitudinal direction of the unit in a line and a light receiving unit having a plurality of light receiving elements disposed along a longitudinal direction of the unit in a line.

A light curtain is formed by a plurality of light axes formed between the light emitting and receiving units. When some object intrudes into the light curtain, the sensor detects blocking of some of the light axis of the light curtain and outputs a cutout order signal for stopping a power source of a motor for driving the hazardous source so as to maintain a safety by stopping the operation of the hazardous source forcibly.

In general, a multi-optical axis photoelectric sensor uses an infrared ray as the light emitted by the light emitting element. In this case, since the infrared ray is invisible and the multi-optical axis photoelectric sensor comprises only two elongated casings, it is difficult to visibly position the light curtain.

If an operator can recognize the position of the light axes of the light curtain, it will increase the level of safety of the operation.

In view of the above requirement, it has already been proposed that a multi-optical axis photoelectric sensor has a plurality of indicators disposed at a side surface being different from a front surface of a casing for emitting the light or receiving the light.

However, in this conventional technology, when the casing of the light emitting or light receiving unit is covered by a protecting cover made of some metal to protect the sensor or to reinforce the sensor, the indicators are also covered by the cover except for the light emitting or light receiving surface and therefore becomes invisible for an operator.

Further, for example JP-A-1999-345548 and corresponding U.S. Pat. No. 6,414,603 describe a light emitting unit of a multi-optical axis photoelectric sensor having a plurality of indicating elements along a longitudinal direction of the unit across an approximately total length of the unit.

However, since the optical axes and the indicating elements are facing to outside of the unit through a light emitting surface and are parallel with each other along the longitudinal direction, a width of the light emitting surface becomes wider in a transverse direction of the unit.

Further, since an axis including the plurality of the indicating elements disposed along the longitudinal direction is offset to the optical axes disposed along the longitudinal direction, it is difficult for an operator to recognize an exact plane having the light curtain.

SUMMARY OF THE INVENTION

Accordingly, a purpose of the present invention is to provide a multi-optical axis photoelectric sensor that is able to prevent the intrusion of an object into the light curtain area toward a hazardous area by being able to visibly identify the exact location of the light curtain area.

To achieve such a purpose of the present invention, a multi-optical axis photoelectric sensor has a light emitting unit having a first casing and a plurality of light emitting elements being equally spaced from each other from one end portion of the first casing to another end portion of the first casing in a first row, a light receiving unit having a second casing and a corresponding number of light receiving elements as the number of the light emitting elements being equally spaced from each other from one end portion of the second casing to another end portion of the second casing in a second row, a light emitting circuit installed into the light emitting unit for driving the light emitting elements forming the optical axes, a light receiving circuit installed into the light receiving unit for processing a first signal from the light receiving elements forming the optical axes with the light emitting elements, a status output circuit for outputting a binary signal corresponding to each of a first status being a light through status to all of the optical axes and a second status being a light blocked status to at least one optical axis based on a second signal from the light receiving circuit, a diagnosis device for diagnosing a malfunction of the light emitting circuit, the light receiving circuit and the status output circuit, a first indicating portion disposed at each of the light emitting and receiving units comprising a plurality of first indicating elements being in the same row of each of the light emitting and receiving elements with no-interference to each of the light emitting and receiving elements, a second indicating portion disposed at one of the light emitting and receiving units and comprising a plurality of second indicating elements being out of the same row of one of the light emitting and receiving elements of the units having the second indicator portion with no-interference to one of the light emitting and receiving elements of the units having the second indicator portion and an indicating control portion for turning on the plurality of the first indicating elements of the first indicating portion to show the first and second rows of the units when the binary signal indicating the first status is output by the status output circuit and indicating a result of the diagnosis based on the diagnosis device with a predetermined turn-on pattern of the plurality of the second indicating elements of the second indicating portion when a malfunction is diagnosed by the diagnosis device.

According to the present invention, in a normal mode, since all of the optical axes has a light through status as a first status, all of the indicating elements are turned on.

Therefore, since an operator can see the area forming the light curtain, it is easy to prevent an object intrusion into the light curtain.

Further, since the indicating elements are disposed along a row forming a plurality of the light emitting and receiving elements, the width of the indicating elements and the light emitting or receiving elements becomes narrow.

BRIEF DESCRIPTION OF THE DRAWINGS

FIG. 4A is a resolved perspective view of a light emitting or receiving unit of a multi-optical axis photoelectric sensor according to a first embodiment of the present invention;

FIG. 4B is a perspective view of a light emitting or receiving unit of a multi-optical axis photoelectric sensor according to a first embodiment of the present invention;

FIG. 8A is a plan view of one of a light emitting or receiving unit for explaining a Turn-On pattern of first indicating elements according to an embodiment of the present invention;

FIG. 8B is a table showing a Turn-On pattern of first indicating elements according to an embodiment of the present invention;

DETAILED DESCRIPTION OF THE INVENTION

Preferred embodiments of the present invention will be described in view of the drawings.

FIGS. 1-4 show a first embodiment of the present invention.

Figure 2:
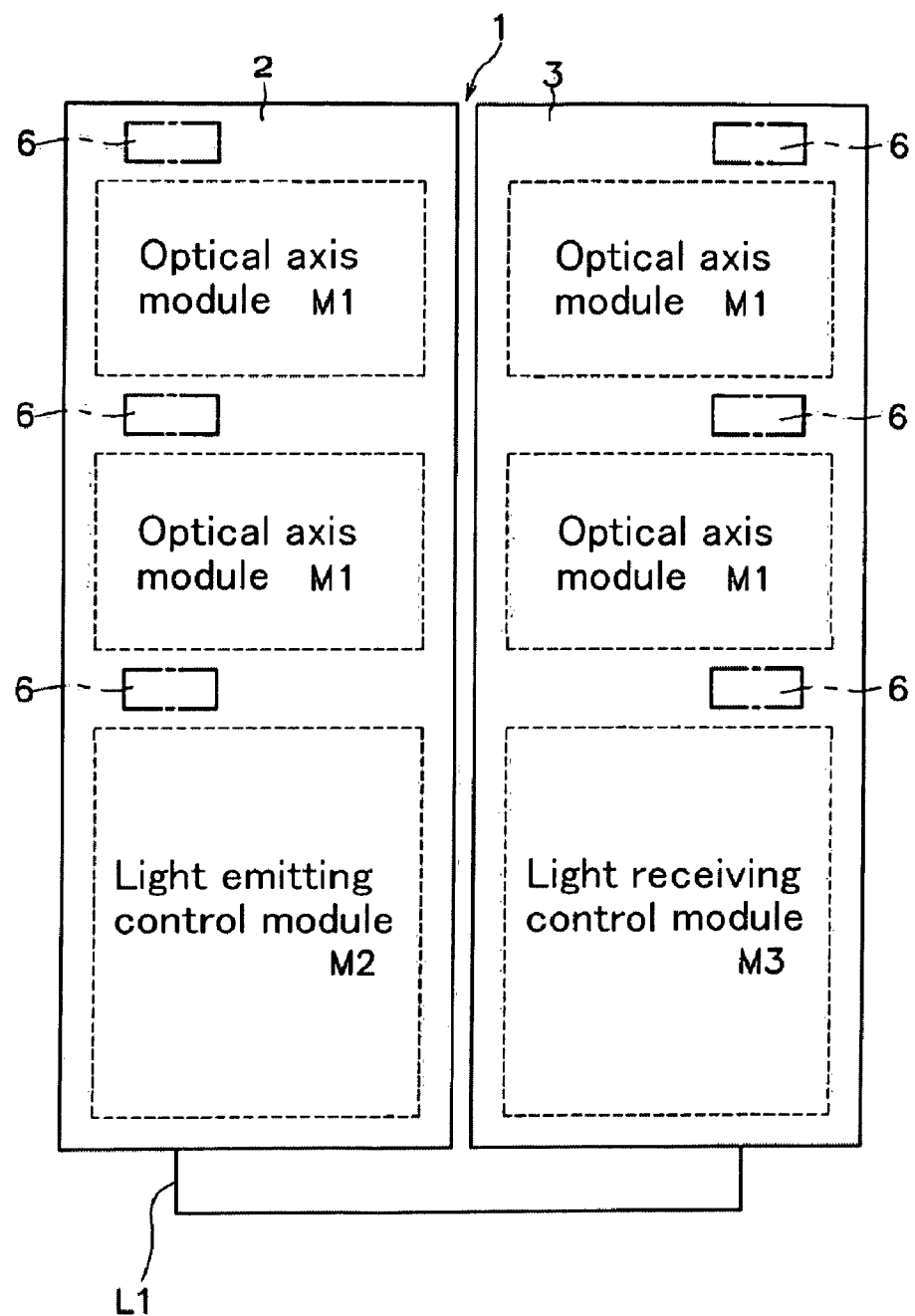
FIG. 2 is a block diagram showing a multi-optical axis photoelectric sensor according to a first embodiment of the present invention.

In FIG. 2, a multi-optical axis photoelectric sensor 1 has a light emitting unit 2 and a light receiving unit 3 as a pair of units which are connected to each other by way of a communication line or a signal line L1.

Each of the light emitting and receiving units 2 and 3 is able to extend as a series connection by adding one building module M1 to another building module M1.

Figure 3:
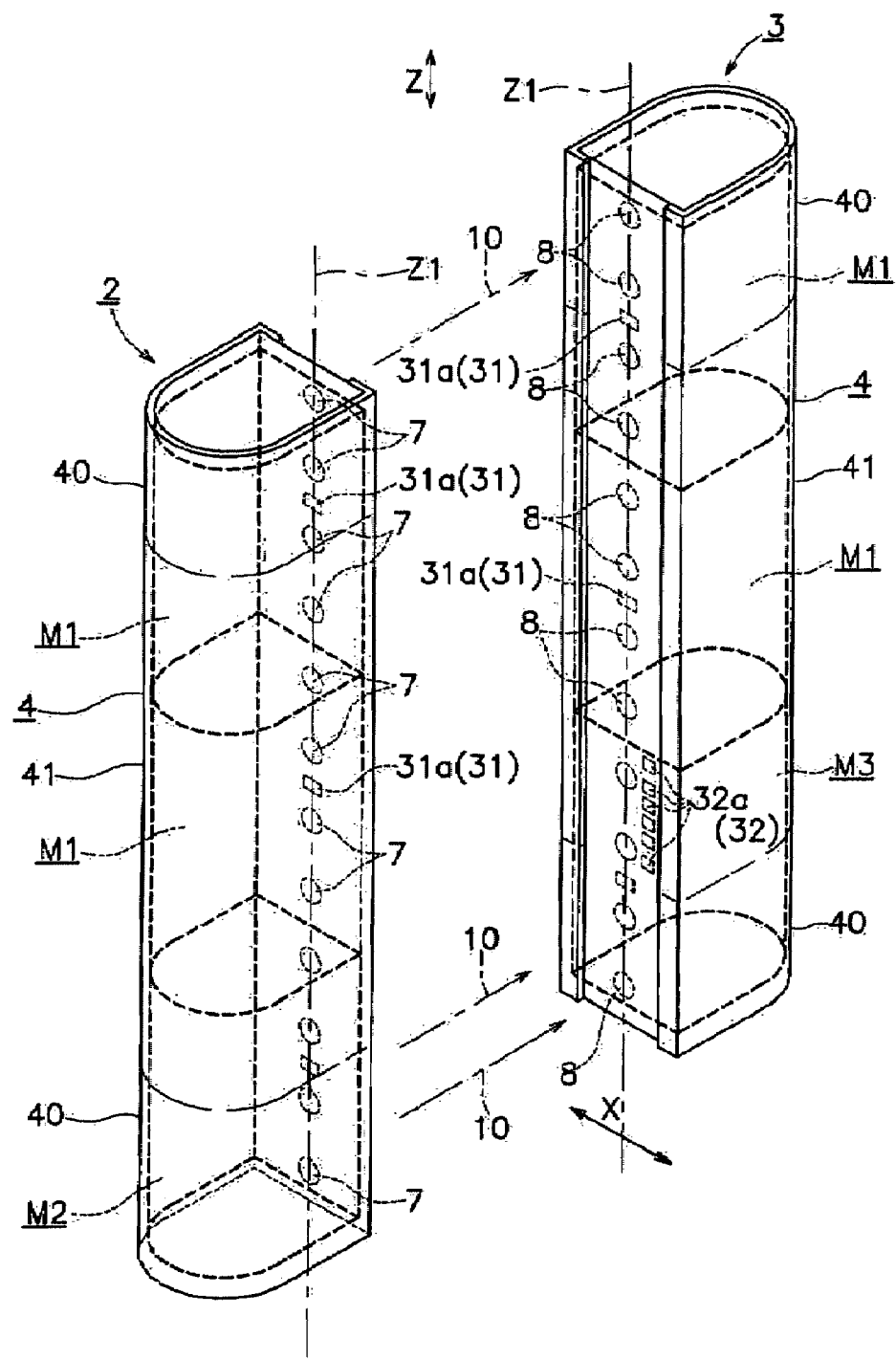
FIG. 3 is a perspective view of a multi-optical axis photoelectric sensor according to a first embodiment of the present invention.

In FIG. 3, the N number of light emitting elements 7 are disposed in a casing 4 of the light emitting unit 2 having an elongated shape along a longitudinal direction Z. Each of the light emitting elements 7 is disposed with the same interval distance along the longitudinal direction Z.

Similarly, the N number of light receiving elements 8 are the same number as the light emitting elements 7 of the light emitting unit 2 and are disposed in a casing 4 of the light emitting unit 3 having an elongated shape along a longitudinal direction Z. Further, each of the light emitting elements 8 is also disposed with an interval distance being equal to the interval distance between the light emitting elements 7.

The light emitting and receiving units 2 and 3 are disposed at the same two-dimensional plane and are facing each other to form a safety light curtain between the light emitting and receiving units 2 and 3.

In more detail, the light curtain is formed by emitting a light beam from each light emitting element 7 of the light emitting unit 2 to each light receiving element B of the light receiving unit 3. Each numeral 10 shows a light axis indicating an emitting light from each light emitting element 7 to each light receiving element 8.

Figure 1:
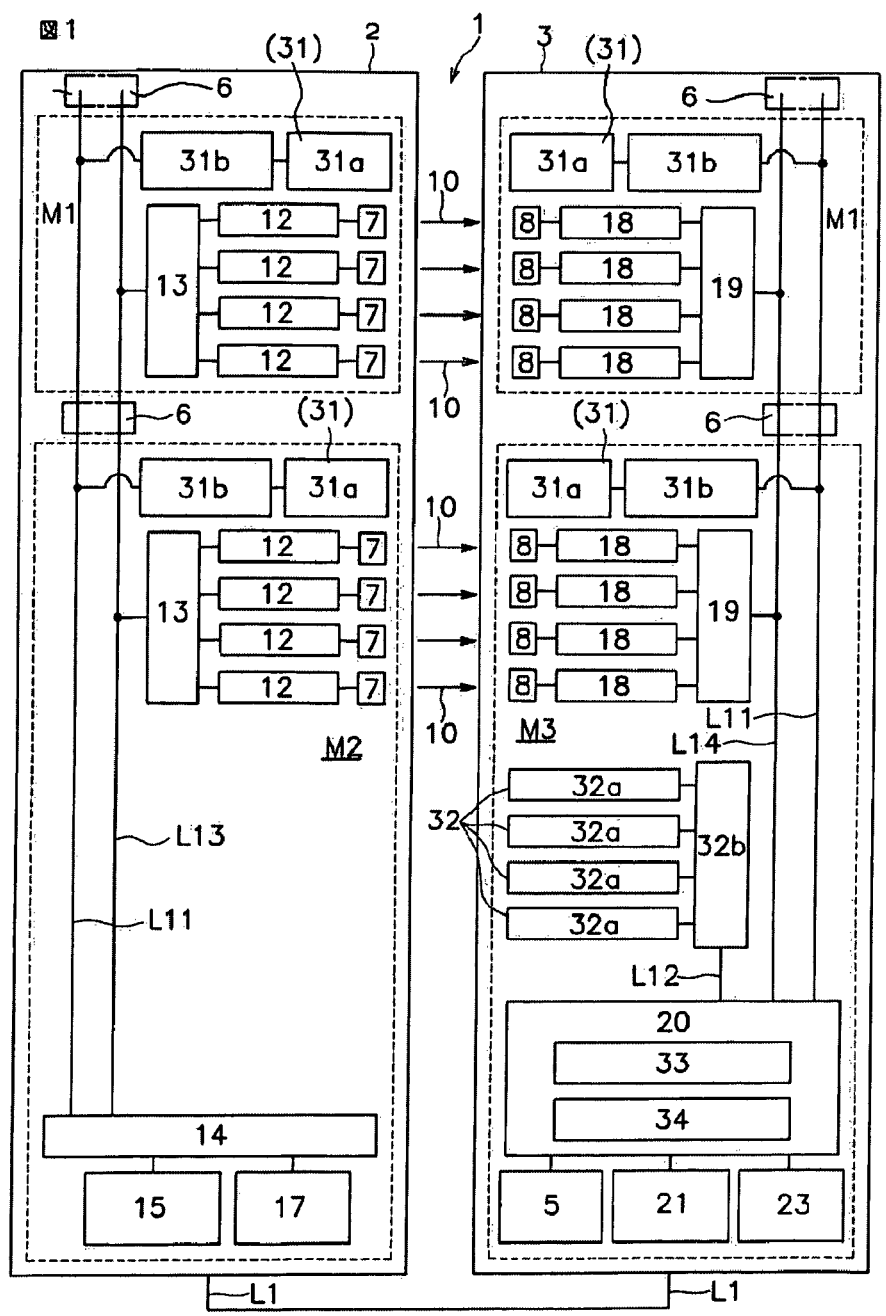
FIG. 1 is a block diagram showing a light emitting or receiving unit of a multi-optical axis photoelectric sensor according to a first embodiment of the present invention.

For example, referring to FIGS. 1 and 2, the light emitting element 7 is an infrared light-emitting diode. On the other hand, the light receiving element 8 is, for example a photodiode to receive the infrared light from the light emitting element 7. Each of the light emitting and receiving elements 7 and 8 has a collecting lens (not shown) in front of each of them.

The light emitting unit 2 has the N number of the light emitting elements 7 like the light-emitting diodes, the N number of light emitting circuits 12 for driving the light emitting elements 7 respectively, an element switching-circuit 13 for scanning the light emitting circuits 12 with time-sharing and a light emitting control circuit 14 for controlling the light emitting unit 2 as a whole.

The light emitting control circuit 14 generates a light emitting timing to emit the N number of the light emitting elements 7 in turn by receiving a clock signal from a clock generating circuit 15.

The light emitting unit 2 also includes a communication control circuit 17 for controlling communication between the light emitting and receiving units 2 and 3, for example controlling communication of the timing signal and communication with the additional extended light emitting unit 2. The light emitting control circuit 14 receives an order from the light receiving unit 3 and activates the N number of the light emitting circuit 12 in a series.

Thus, each light emitting toward the light receiving unit 3 is carried out with a predetermined light emitting timing from the light emitting element 7 corresponding to a first optical axis 10 through the light emitting element 7 corresponding to N-th optical axis 10 in a series.

The light receiving unit 3 has the N number of the light receiving elements 8, the N number of light receiving circuits 18 for driving the light receiving elements 8 respectively, an element switching circuit 19 for scanning the light receiving circuits 18 with time-sharing and a light receiving control device 20 for controlling the light receiving unit 3 as a whole. The light receiving control device 20 receives a clock signal from a clock generating circuit 21 to activate the N number of the light receiving elements 8 in a series.

Further, the light emitting unit 3 also includes a communication control circuit 23 for controlling communication between the light emitting and receiving units 2 and 3, for example controlling communication of the timing signal and communication with the additional extended light receiving unit 3. The light receiving control device 20 receive the timing signal from the light emitting unit 2 and activates the N number of the light receiving circuit 18 in a series to receives outputs of the light receiving elements 8 corresponding to emitted light beams in a series from the light emitting unit 2.

Displacement of the Light Emitting Unit 2 and Light Receiving Unit 3

The light emitting and receiving units 2 and 3 as a pair unit can be provided with several layouts. For example, in the case of a press machine, the units 2 and 3 can be disposed so as to surround the press machine like a U-shaped and in the case of a conveyer, the units 2 and 3 can be disposed at the entrance and exit.

Module M1 Through M3

As shown in FIG. 2, the light emitting unit 2 has one or more of the optical axis module M1 as the building module and one light emitting control module M2. Each optical axis module M1 is connected to the other optical axis module M1 by way of a connector 6 in a series. Further, the other end portion of the connected optical axis module M1 is connected to the light emitting control module M2 by way of the other connector 6.

In more detail, the connector 6 of the module M2 is a conventional male or female shaped connector and one connector 6 of the module M1 connected to the connector 6 of the module M2 is the other shaped connector against the connector 6 of the module M2. Further, the other connector 6 of the module M1 connected to the other extended module M1 is the same type connector to the connector 6 of the module M2.

On the other hand, the light receiving unit 3 has one or more optical axis module M1 as the building module and one light receiving control module M3. Each optical axis module M1 is connected to the other optical axis module M1 by way of a connector 6 in a series. Further, the other end portion of the connected optical axis module M1 is connected to the light receiving control module M3 by way of the other connector 6.

In more detail, the connector 6 of the module M3 is one of a conventional male or female shaped connector and one connector 6 of the module M1 connected to the connector 6 of the module M3 is the other shaped connector against the connector 6 of the module M3. Further, the other connector 6 of the module M1 connected to the other extended module M1 is the same type connector to the connector 6 of the module M3.

Each of the light emitting and receiving control modules M2 and M3 is connected to the communication line L1 by way of communication control circuits 17 and 23 respectively.

Optical Axis Module M1

As shown in FIG. 1, the optical axis module M1 has at least two of the light emitting element 7 or light receiving element 8, a first indicating element 31a and a first indicating controller 31b for controlling the first indicating element 31a. Accordingly, each light axis module M1 has at least two or more optical axes 10.

For example, the first indicating element 31a is two light-emitting diodes having a red emitting color and green emitting color. The two light-emitting diodes are selected by the first indicating controller 31b to indicate the current status of the relationship between the units 2 and 3.

One indicating element as the first indicating element 31a is provided to one optical axis module M1 as a preferred first embodiment of the present invention. In other words, the number of the first indicating elements 31a is smaller than the number of the optical axes 10 installed into the each of the light emitting and receiving units 2 and 3.

Light Emitting Control Module M2

The light emitting control module M2 is a sort of the optical axis module and has the light emitting elements 7, the light emitting circuits 12, the element switching circuit 13, the first indicating elements 31a, a first indicating control portion 31b, the light emitting control circuit 14, the clock generating circuit 15 and the communication control circuit 17.

Light Receiving Control Module M3

The light receiving control module M3 is a sort of an optical axis module and has the light receiving elements 8, the light receiving circuits 18, the element switching circuit 19, the first indicating elements 31a and a first indicating control portion 31b, an input-output portion 5, the light receiving control portion 20, the clock generating circuit 21, the communication control circuit 23, a second indicating portion 32 including a plurality of second indicating elements 32a and a second indicating control portion 32b for controlling the second indicating elements 32a.

For example, the second indicating element 32a has two light-emitting diodes like the first indicating elements 31a and is able to select one specified color from red and green.

Further, in FIG. 1, the optical module M1 corresponding to each of the light emitting and receiving units 2 and 3 is shown as one module respectively. However, as shown in FIGS. 2, 3 and 8, the optical modules M1 are extendable.

Signal Lines L11 Through L14

As shown in FIG. 1, the first indicating control portions 31b of the modules M1 as the light emitting side are connected to each other by way of a signal line L11 and also connected to the light emitting control circuit 14 of the light emitting control module M2 by way of line L11.

The element switching circuits 13 are connected to each other by way of the line L13 and also connected to the light emitting control circuit 14 of the light emitting control module M2 by way of line L13.

The first indicating control portions 31b of the modules M1 as the light receiving side are connected to each other by way of a signal line L11 and also connected to the light receiving control portion 20 of the light emitting control module M3 by way of line L11.

The element switching circuits 19 of the light receiving side are connected to each other by way of the line L14 and also connected to the light receiving control portion 20 of the light emitting control module M3 by way of line L12.

Casing 4

As shown in FIG. 3, the light emitting unit 2 has modules M1 and M2 installed into the casing 4 of the light emitting side. Also, the light receiving unit 3 has modules M1 and M3 installed into the casing 4 of the light receiving side.

As shown in FIG. 4 A, the casing 4 has end casings 40 disposed at the both end portions of the casing 4 and an intermediate casing 41 disposed between both end casings 40. The casing 4 has a U-shaped sectional view in a transverse direction of the casing 4.

As shown in FIG. 4, each of the end casings 40 has one opening end portion 40a in the longitudinal direction Z to connect with one end portion 41a of the intermediate casing 41.

Further, as shown in FIG. 4, each of the end casings 40 has one closed end portion 40b in the longitudinal direction Z being located at an outermost place of the casing 4.

Accordingly, an outermost light emitting or receiving element 7 or 8 disposed at the both ends of all of the light emitting or receiving elements 7 or 8 in the casing 4, is disposed in the end casing 40, especially adjacent to the closed end portion 40b.

Furthermore, as shown in FIG. 4, two light emitting or receiving elements 7 or 8 are installed into each end casing 40. However, it is also preferred that at least one element 7 or 8 is installed into the casing 40.

As shown in FIG. 3, one or more optical axis module M1 is installed into the casing 4 of the light emitting side and the light emitting control module M2 is also installed into the casing 4 of the light emitting side at one end portion of the casing 4.

Further, one or more optical axis module M1 is installed into the casing 4 of the light receiving side and the light emitting control module M3 is also installed into the casing 4 of the light receiving side at one end portion of the casing 4.

According to the above-mentioned embodiment, the light emitting control module M2 has the light emitting elements 7 and the light receiving control module M3 has the light receiving elements 8. However, it is also preferred that each of the control modules M2 and M3 has no element 7 or 8.

Displacement of the First Indicating Elements 31a

The casing 4 of the light emitting side and the casing 4 of the light receiving side are confronted with each other as shown in FIG. 3 so as to position between each of the light emitting elements 7 and each of the light receiving elements 8.

The light emitting elements 7 are disposed along the longitudinal direction Z and the light receiving elements 8 are also disposed along the longitudinal direction Z.

Each of the first indicating portion 31 comprising a plurality of the first indicating elements 31a, is disposed at a portion being on a line including all of the light emitting elements 7 or receiving elements 8 along the longitudinal direction Z and where there is no-interference to the light emitting or receiving elements 7 and 8.

In other words, each of the first indicating elements 31a is disposed between the light emitting elements 7 or light receiving elements 8 on the longitudinal direction Z which is positioned on all of the light emitting or receiving elements 7 and 8.

Further, each of the first indicating elements 31a has approximately the same pitch to the adjacent first indicating element 31a on a center line Z1 along the longitudinal direction Z.

As shown in FIGS. 4A and 4B, the first indicating elements 31a are disposed at a portion adjacent to the both end portions of each of the light emitting and receiving units 2 and 3 and also disposed at several portions between both end portions of each of the light emitting and receiving units 2 and 3.

The first indicating elements 31a disposed at both end portions of each of the light emitting and receiving units 2 and 3 are installed into each of the end casings 40. Further, the center line Z1 is disposed at a center portion against a transverse direction X of the casing 4.

As shown in FIG. 3, a distance between each of the outermost light emitting and receiving elements 7 and 8 disposed at the end casings 40 and the closed end portion 40b of the end casing 40 is closer than the distance between the position of the first indicating element 31a disposed at the end casing 40 and the closed end portion 40b.

Therefore, a distance between the outermost optical axis 10 installed into the casing 40 and the closed end portion 40b of the casing 40 is closer than a distance between the first indicating element 31a installed into the end casing 40 and the closed end portion 40b.

Displacement of the Second Indicating Elements 32a

The second indicating portion 32 comprising a plurality of the second indicating elements 32a is disposed at a place being out of the center line Z1 on a surface of the light receiving unit 3 facing the light emitting unit 2 and having no-interference to any of the light receiving elements 8.

Further, the second indicating portion 32 is also located on the surface of the light emitting unit 2 facing the light receiving unit 3.

Furthermore, the second indicating portion 32 is located at the both of the light emitting and receiving units 2 and 3.

Input-output Portion 5

The input-output portion 5 has a function for inputting and outputting from and to an external device (not shown) as a controller function.

The input-output portion 5 has safety and non-safety output control circuits (not shown) which output a signal to a safety control device or non-safety control device when a hazardous source like a press machine is detected.

The light receiving control portion 20 of the light receiving control module M3 shown in FIG. 1 has a status output circuit 33 and a diagnosis device 34.

The input-output portion 5 controls the light emitting unit 2, the light receiving unit 3 and the press machine or the other control devices connected to the input-output portion 5 based on a signal output from the light receiving control portion 20.

For example, the multi-optical axis photoelectric sensor 1 can be installed with several modes, including a normal mode, a mute mode, an optical axis setting mode and a diagnosis mode or the like.

Normal Mode

The normal mode is a mode for detecting an object intruding into the light curtain area based on a status of the optical axes forming between the light emitting elements 7 and the light receiving elements 8, especially a light through status and a light blocked status.

In the normal mode, the status output circuit 33 shown in FIG. 1 outputs a binary signal corresponding to a first status indicating the light through status to all of the optical axes 10 and a second status indicating the light blocked status to at least one optical axis 10 based on a signal from the light receiving circuit 18 by way of the element switching circuit 19.

In the normal mode, the input-output portion 5 turns on the first indicating elements 31a of the first indicating portion 31 for indicating a detection area formed by the optical axes 10 based on the received binary signal and also turns on the second indicating elements 32a of the second indicating portion 32 based on the output status of the status output circuit 33.

In more detail, in the normal mode, the input-output portion 5 turns on the first indicating elements 31a with one of a predetermined turn-on patterns based on the status signal from the status output circuit 33.

For example, the input-output portion 5 turns on all of the first indicating elements 31a to "green-color", when the input-output portion 5 receives the binary signal indicating the first status. On the other hand, when the input-output portion 5 receives the binary signal indicating the second status, the external device like the press machine or the like connected to the input-output portion 5 stops the operation based on the output signal from the input-output portion 5.

At the same time, the input-output portion 5 turns off the first indicating elements 31a corresponding to the optical axis modules M1, M2 and M3 having the optical axis being the light blocked status and turns on the first indicating elements 31a corresponding to the optical axis modules M1, M2 and M3 having the optical axis being the light through status to "red-color".

Further, in case of input-output portion 5 receiving the binary signal indicating the second status, it is also preferred that all of the second indicating elements 32a turns on with "red-color" based on the output signal from the input-output portion 5 at the same time to the above-mentioned action to the first indicating elements 31a.

One preferred example for a turn-on pattern in view of FIG. 8 will be described.

As shown in FIGS. 8A and 8B, in case of all of the optical axes $10_1$ through $10_n$ becoming the light through status, all of the first indicating elements $31a_1$ through $31a_m$ turn on with "green-color". Thus, it becomes clear that the light curtain area comprising all of the optical axes $10_1$ through $10_n$ as the risk area is safe.

Further, when the optical axis $10_1$ located at the closest position to the end portion of one end casing 40 becomes the light through status and at least one of the other optical axes $10_2$ through $10_n$ becomes the light blocked status, the first indicating element $31a_1$ corresponding to the modules M2 and M3 including the light emitting and receiving elements 7 and 8 respectively forming the optical axis $10_1$ located at the closest position to the end portion of the one end casing 40, turns on with "red-color".

Similarly, when the optical axis $10n$ located at the closest position to the end portion of another end casing 40 becomes the light through status and at least one of the other optical axes $10_1$ through $10_{n-1}$ becomes the light blocked status, the first indicating element $31am$ corresponding to the modules M1 including the light emitting and receiving elements 7 and 8 respectively forming the optical axis $10n$ located at the closest position to the end portion of another end casing 40, turns on with "red-color".

Furthermore, when the optical axes $10_1$ and $10n$ located at the closest position to the end portions of the both end casings 40 becomes the light through status and at least one of the other optical axes $10_2$ through $10_{n-1}$ becomes the light blocked status, all of the first indicating elements $31a2$ through $31am-1$ corresponding to the intermediate casing 41 in addition to the first indicating elements 7 corresponding to both end casings 40, turn on with "red-color".

In addition to the above explanation, when the optical axis $10_1$ located at the closest position to the end portion of one end casing 40 becomes the light blocked status, the first indicating elements $31a_1$ and $31a_2$ through $31a_{m-1}$ corresponding to the modules M1, M2 and M3 having the light emitting and receiving elements 7 and 8 forming the optical axes being the blocked status, turn off.

Similarly, when the optical axis $10_n$ located at the closest position to the end portion of another end casing 40 becomes the light blocked status, the first indicating elements $31a_m$ and $31a_2$ through $31a_{m-1}$ corresponding to the modules M1 having the light emitting and receiving elements 7 and 8 forming the optical axes being the blocked status, turn off.

Namely, when only the optical axes $10_1$ located at the closest position to the end portions of the one end casing 40 becomes the light through status, only the first indicating element $31a_1$ corresponding to the modules M2 and M3 including the light emitting and receiving elements 7 and 8 respectively forming the optical axis $10_1$ located at the closest position to the end portion of the one end casing 40, turns on with "red-color" and the other first indicating elements $31a_2$ through $31a_m$ corresponding to the other axes turn off.

Similarly, when only the optical axes $10_n$ located at the closest position to the end portions of another end casings 40 becomes the light through status, only the first indicating element $31a_m$ corresponding to the modules M1 including the light emitting and receiving elements 7 and 8 respectively forming the optical axis $10n$ located at the closest position to the end portion of another end casing 40, turns on with "red-color" and the other first indicating elements $31a_1$ through $31a_{m-1}$ corresponding to the other axes turn off.

In case of the above-mentioned turn on patterns, when the multi-optical axis photoelectric sensor 1 is set, it is easy to adjust the optical axes forming between each of the light emitting and receiving elements 7 and 8 of the light emitting and receiving units 2 and 3. One of the both end optical axis $10_1$ or $10_n$ is adjusted and another of the both end optical axis $10_1$ or $10n$ is adjusted with viewing the status indicated by the first indicating element $31a_1$ through $31a_m$.

As a different turn on pattern, it is also preferred when at least one optical axis is a light blocked status, only the first indicating element 31a corresponding to the modules M having the light emitting and light receiving elements 7 and 8 forming the light blocked optical axis, turns off and the other first indicating elements 31 corresponding to the modules M having the light emitting and light receiving elements 7 and 8 forming the light through optical axis, turn on with "red-color".

In this case, when all of the optical axes 10 become the light through status, all of the first indicating elements 31a turn on with "green-color".

This turn on pattern is also useful to adjustment of the optical axes of the multi-optical axis photoelectric sensor 1.

The multi-optical axis photoelectric sensor 1 is able to diagnose a malfunction of the light emitting circuit 12, the light receiving circuit 18 and the status output circuit 33. As a result of the diagnosis, the diagnosis device 34 sends a signal indicating whether there is a malfunction of these circuits 12, 18 and 33 or not to the input-output portion 5.

In the diagnosis mode, the first indicating elements 31a are turned on with one of the predetermined turn on patterns by the input-output portion 5, after the input-output portion 5 receives the diagnosis signal from the diagnosis device 34.

For example, in the case of input-output portion 5 receiving the diagnosis signal indicating at least one of the circuits 12, 18 and 33 malfunctioning, it is preferred that all of the first indicating elements 31a repeats to turn on with "red-color" and turn off as flashing.

Further, in addition to the above action of the first indicating elements 31a, it is also preferred that the second indicating elements 32a are turned on with a predetermined turn on pattern by the input-output portion 5 so as to communicate malfunction and the portion having the malfunction to an operator.

Furthermore, in the above embodiment, the status output circuit 33 is a sort of a circuit for operating the above-mentioned function. However, it is also preferred that the above-mentioned function of the status output circuit 33 be carried out by a programmed software.

Mute Mode

A mute mode is a mode for deactivating a security function like the normal mode of the multi-optical axis photoelectric sensor 1 temporarily, when an object passes through the safety light curtain comprising all of the optical axes 10.

In the case of the muting mode, the status output circuit 33 outputs a signal corresponding to the first status regardless of the optical axes being the light through or the light blocked status to the input-output portion 5.

Further, in the case of the mute mode, the first indicating elements 31a of the first indicating portion 31 is turned on with a predetermined pattern corresponding to the first status signal from the status output circuit 33 by way of the input-output portion 5 and the second indicating portion 32 indicating information about the mute mode.

For example, in the case of the mute mode, all of the first indicating elements 31a turn on with "green-color" and the second indicating elements 32a repeat to turn on with "green-color" and turn off to inform the mute mode to the operator.

Further, at each of the above-mentioned modes, it is also preferred to use different patterns except for the above-explained patterns. Furthermore, the operator of the multi-optical axis photoelectric sensor 1 can set a desired pattern to each mode.

In addition to the above-mentioned modes, when the multi-optical axis photoelectric sensor 1 has the other modes including an interlock release mode or override mode, the multi-optical axis photoelectric sensor 1 has any independent pattern for each of these modes.

A second preferred embodiment of the present invention in view of FIG. 5 will be described.

Figure 5:
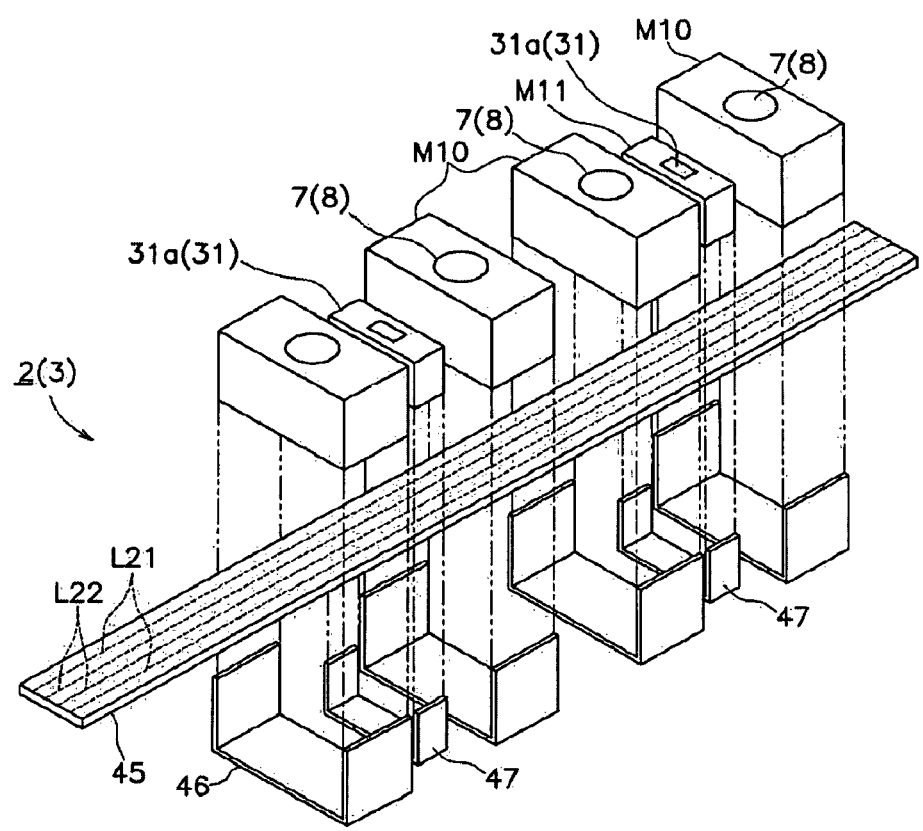
FIG. 5 is a perspective view of modules of a multi-optical axis photoelectric sensor according to a second embodiment of the present invention.

As shown in FIG. 5, each optical axis module M10 has one light emitting element 7 or light receiving element 8. Each indicating module M11 has one of the first indicating elements 31a.

The multi-optical axis photoelectric sensor 1 has a flat-shaped cable 45 including a first and second communication lines L21 and L22, the optical axis module M10, the indicating module M11 and first and second fixing tools 46 and 47 for fixing the optical axis module M10 and the indicating module M11 to the flat-shaped cable 45 respectively.

According to the first embodiment of the present invention, since one of the first indicating elements 31a corresponds to one optical axis module M1, M2 or M3 having a plurality of the light emitting or receiving elements 7 or 8, the number of the optical axis modules M1, M2 and M3 is equal to the number of the first indicating elements 31a.

However, according to the second embodiment of the present invention, since each optical axis module has one light emitting or receiving element 7 or 8, a zone concept is provided instead of the module concept to provide the first indicating element 31a to the optical axes 10.

In other words, along the longitudinal direction of the unit 2 or 3, all of the optical axes provided by all of the optical axis modules are separated into several zones as an embodiment of the present invention.

In more detail, as shown in FIG. 5, one of the first indicating elements 31a is provided to two of the optical axis modules M10. In this case, each zone has two optical axis modules and each zone has one of the first indicating elements 31a.

The flat-shaped cable 45 has the first communication line L21 to electrically connect a plurality of the optical axis modules M10 to each other and the second communication line L22 to electrically connect a plurality of the indicating modules M11 to each other.

Further, it is also preferred that the optical axis module M10 has two or more of the light emitting or receiving elements 7 or 8. At this case, it is preferred that one of the first indicating elements 31a is provided to each module having two optical axes or provided to a zone comprising several modules in a series along the longitudinal direction.

Since the other elements of the second embodiment are substantially the same as the first embodiment, a detailed explanation of these elements has been omitted for brevity of description.

A third preferred embodiment of the present invention in view of FIG. 6 will be described.

Figure 6:
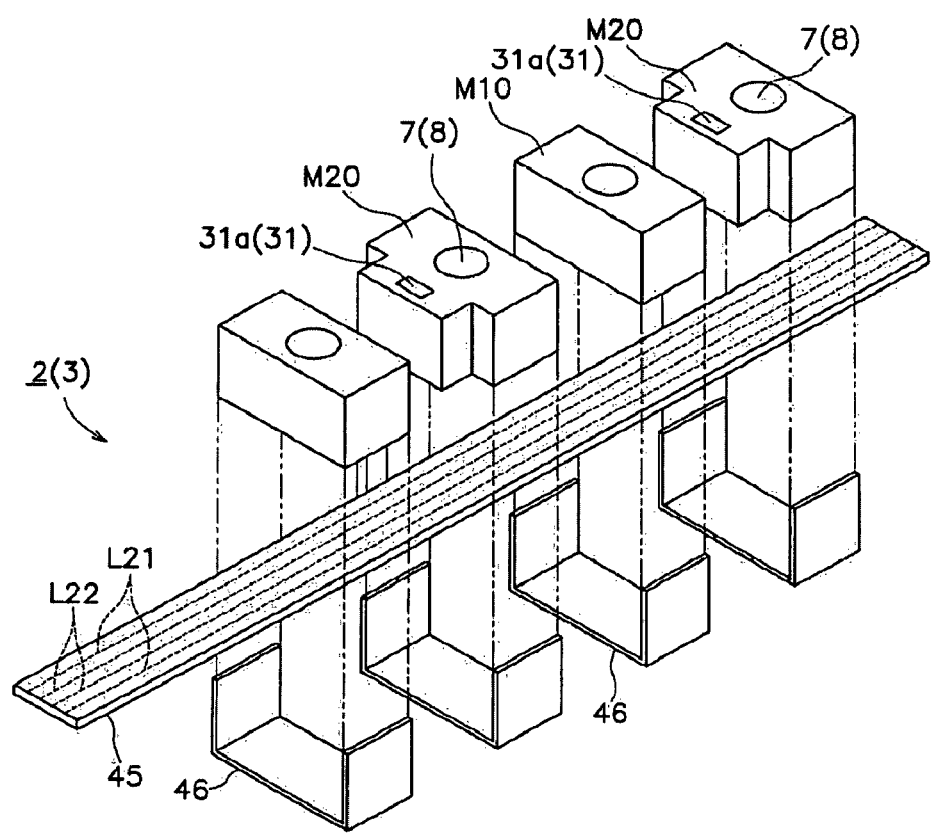
FIG. 6 is a perspective view of modules of a multi-optical axis photoelectric sensor according to a third embodiment of the present invention.

As shown in FIG. 6, each of a first optical axis module M10 has one light emitting element 7 or light receiving element 8.

On the other hand, each of a second optical axis module M20 has one light emitting element 7 or light receiving element 8 and a first indicating element 31a.

Similar to the second embodiment of the present invention, since each optical axis module M10 has one light emitting or receiving element 7 or 8, a zone concept is provided instead of the module concept to provide the first indicating element 31a to the optical axes 10.

Therefore, in a case shown in FIG. 6, the number of the first optical axis modules M10 fixed to the flat-shaped cable 45 by the first fixing tool 46 is the same as the number of the second optical axis module M20 fixed to the flat-shaped cable 45 by the first fixing tool 46.

In more detail, in this case, one of the first indicating elements 31a disposed at the second optical axis module M20 corresponds to two of the light emitting or receiving elements provided at each of the first and second optical axis modules M10 and M20 in a series along the longitudinal direction of the unit 2 or 3.

Further, it is also preferred that each of the first optical axis module M10 and second optical axis module M20 has two or more of the light emitting or receiving elements 7 and 8.

In this case, it is preferred that one of the first indicating elements 31a is provided to each module having two optical axes or provided to a zone comprising several modules comprising the first and second optical axis modules in a series along the longitudinal direction.

Since the other elements of the third embodiment are substantially the same to the first and second embodiments, a detailed explanation of these elements has been omitted for brevity of description.

FIG. 7 shows other examples of the first indicating elements 31a.

Figure 7A:
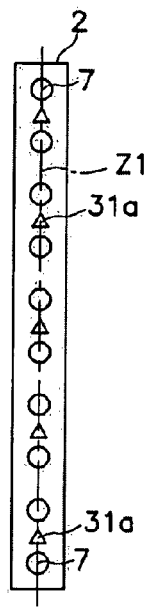
FIG. 7A is a plan view of a first example of first indicating elements of a multi-optical axis photoelectric sensor according to an embodiment of the present invention.

As shown in FIG. 7A, it can be preferred that a shape of the first indicating element 31a is triangle instead of a rectangular-shape described in the first embodiment of the present invention.

Figure 7B:
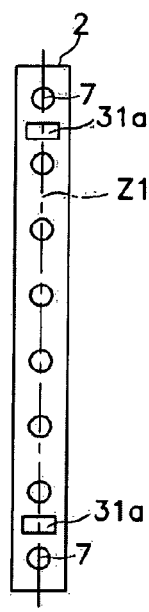
FIG. 7B is a plan view of a second example of first indicating elements of a multi-optical axis photoelectric sensor according to an embodiment of the present invention.

As shown in FIG. 7B, it can be preferred that the first indicating elements are disposed at only both end portions of the unit 2 or 3 indicating the status of the optical module located at a portion being adjacent to the end portion of the unit 2 or 3.

Figure 7C:
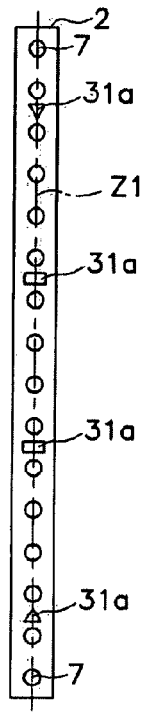
FIG. 7C is a plan view of a third example of first indicating elements of a multi-optical axis photoelectric sensor according to an embodiment of the present invention.

As shown in FIG. 7C, it can be preferred that the first indicating elements 31a are provided with two or more different shapes. In FIG. 7C, both first indicating elements 31a corresponding to both end modules has a triangle-shape and each of the first indicating elements corresponding to the intermediate casing 41 has a rectangle-shape.

Figure 7D:
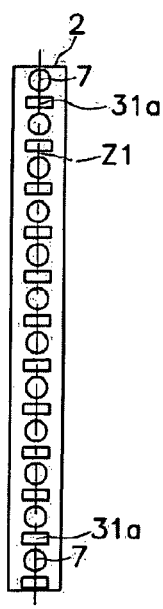
FIG. 7D is a plan view of a fourth example of first indicating elements of a multi-optical axis photoelectric sensor according to an embodiment of the present invention.

As shown in FIG. 7D, it can be preferred that each of the first indicating elements 31a is provided to each of the light emitting or receiving elements 7 or 8.

Figure 7E:
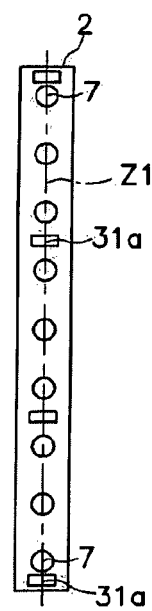
FIG. 7E is a plan view of a fifth example of first indicating elements of a multi-optical axis photoelectric sensor according to an embodiment of the present invention.

As shown in FIG. 7E, it can be preferred that one of the first indicating element installed into the end casing 40 is disposed between the outermost light emitting or receiving element that is installed into the end casing 40 and the closed end portion 40b of the end casing 40.

Figure 7F:
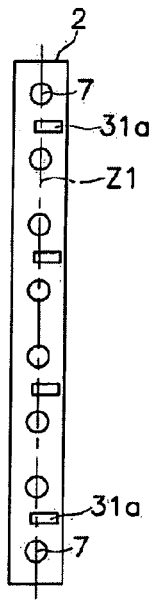
FIG. 7F is a plan view of a sixth example of first indicating elements of a multi-optical axis photoelectric sensor according to an embodiment of the present invention.

As shown in FIG. 7F, it can be preferred that a part of each of the first indicating element 31a is on the center line Z1 and each of the first indicating element 31a as a whole is offset to the center line Z1 in the transverse direction of the unit.

Further, as described in above paragraph; "Displacement of the second indicating elements 32a", as shown in FIGS. 7A through 7F, the second indicating elements 32a is disposed such a way at a place on the surface of the light receiving unit, the light emitting unit or both of them, where it is away from the center line Z1 and has no-interference to any of the light emitting or receiving elements 7 or 8.

Figure 9:
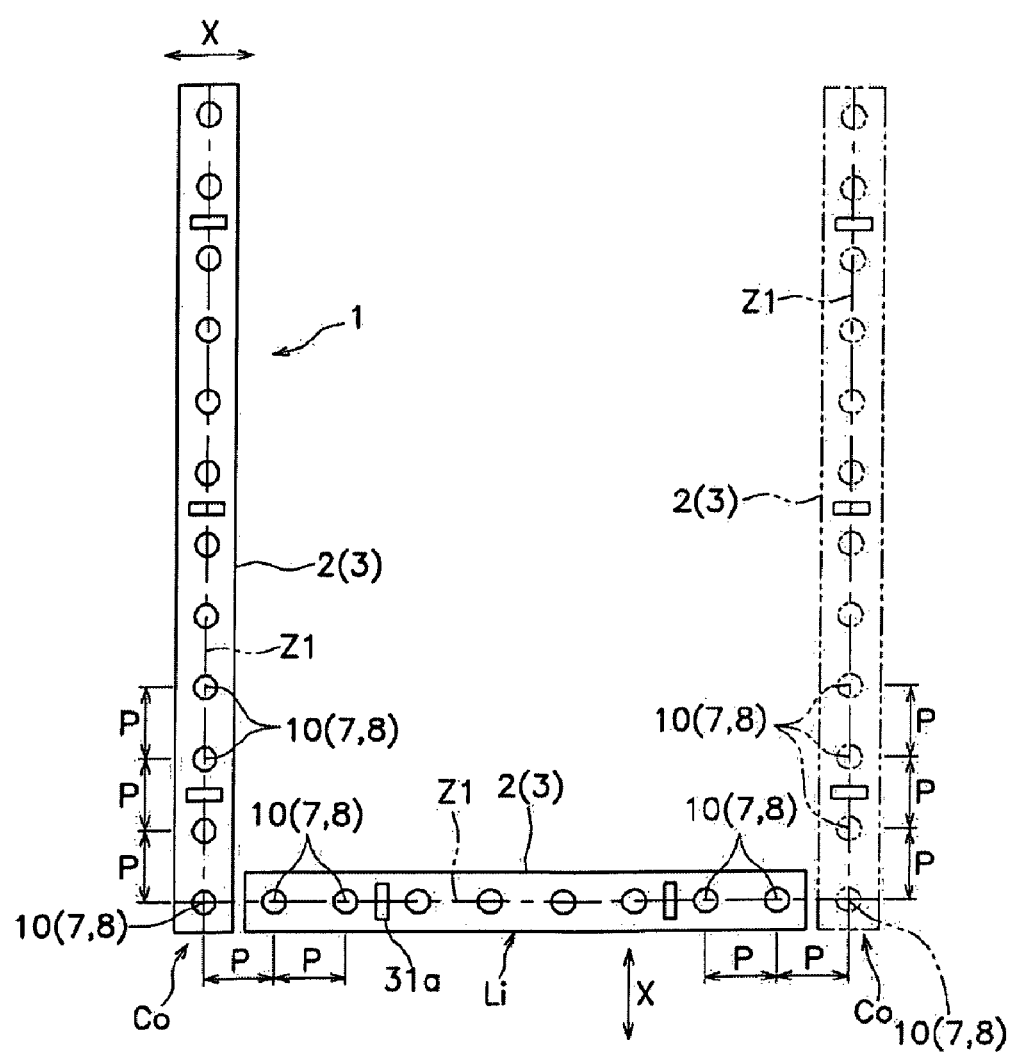
FIG. 9 is a plan view of one of a light emitting or receiving unit showing examples of layouts of a multi-optical axis photoelectric sensor according to an embodiment of the present invention.
Figure 10:
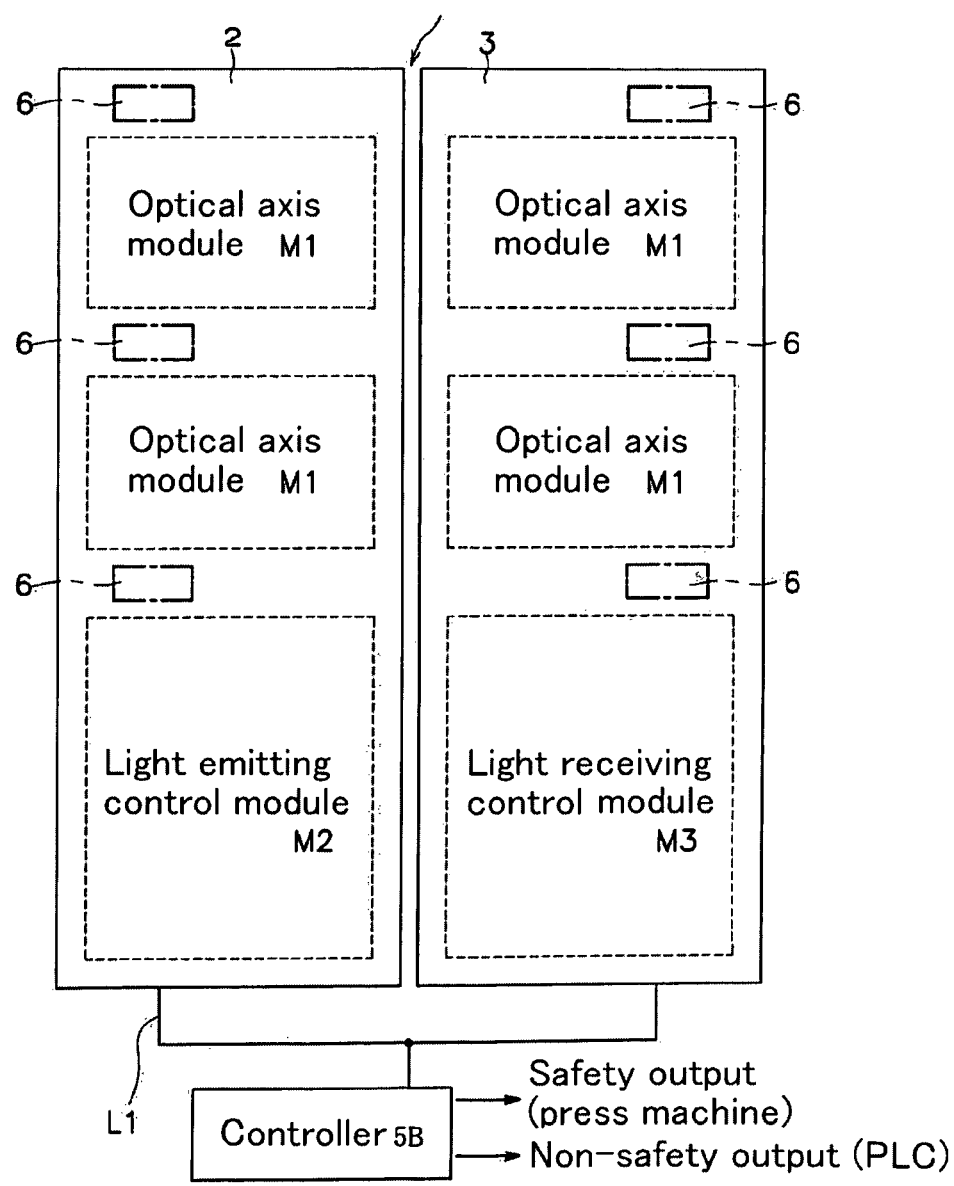
FIG. 10 is a block diagram showing a multi-optical axis photoelectric sensor according to a fourth embodiment of the present invention.

FIG. 9 is one example of a layout of the multi-optical axis photoelectric sensor 1. As shown in FIG. 9, a system of the multi-optical axis photoelectric sensors 1 comprises two of the light emitting units 2 and 2 and two of the light receiving units 3 and 3 having a L-shape indicated by the lines in FIG. 9.

Also, as another system, the system comprises three of the light emitting units 2, 2 and 2 and three of the light receiving units 3, 3 and 3 having a U-shape indicated in FIG. 9 by the solid lines and by the dashed lines.

In these systems, since each optical axis 10 is disposed on the center line Z1 of each unit in the transverse direction of the unit, it is easy to provide a pitch P that is the same as pitch P provided on a straight line Li of each unit to a corner portion Co comprising one end portion of one unit and one end portion of another unit forming 90 degrees.

In the above first embodiment of the present invention, the input-output portion 5 is installed into the light receiving unit 3. However, it is not necessary to provide the input-output portion 5 into the light receiving unit 3. It is also preferred that an outer controller 5B may have the input-output portion 5 as shown in FIG. 6 or the light emitting unit 2 may have the input-output portion 5 instead of the unit 3.

Although the present invention has been fully described by way of example with reference to the accompanying drawings, it is to be understood that various changes and modifications will be apparent to those skilled in the art.

Therefore, unless such changes depart from the scope of the invention as defined by this specification and claims, they should be construed as being included herein.

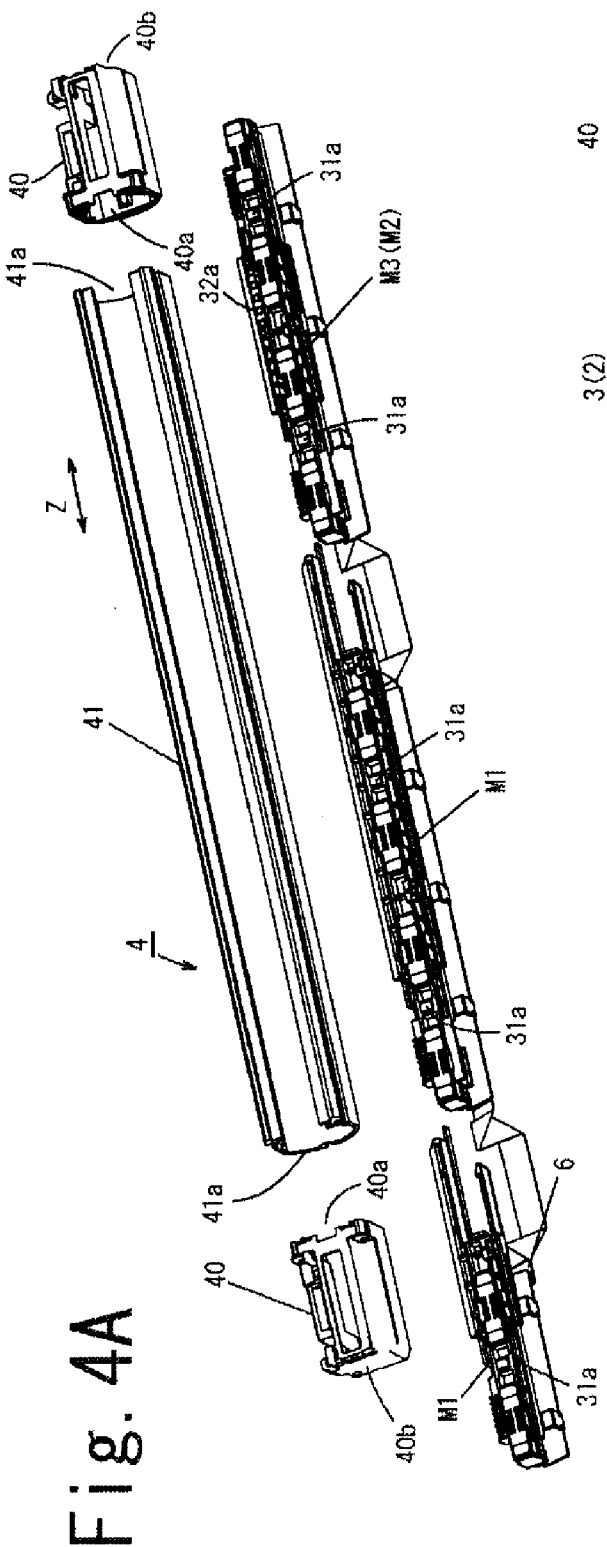
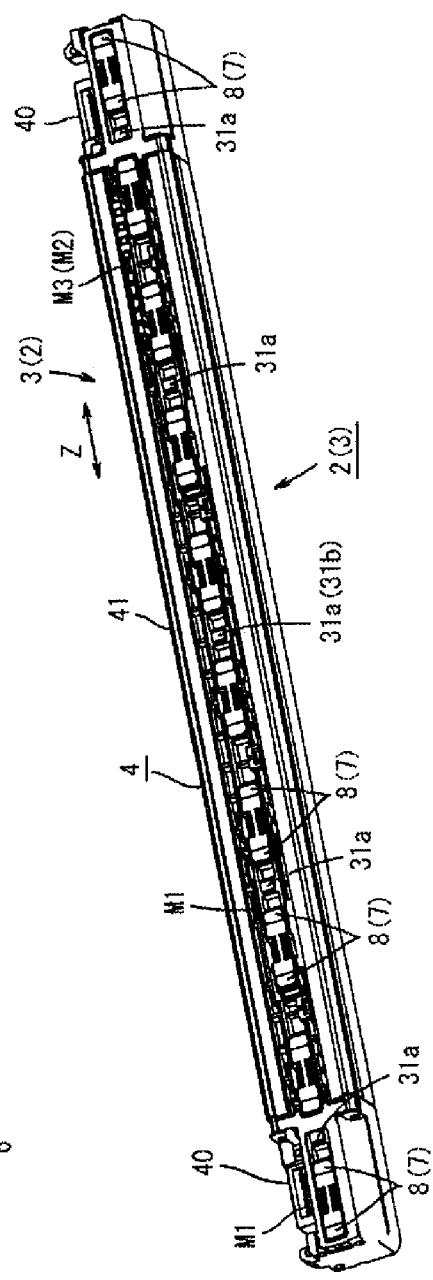

What is claimed is:

1. A multi-optical axis photoelectric sensor comprising:
a light emitting unit having an elongated first casing along a longitudinal direction of said first casing and a plurality of light emitting elements being equally spaced from each other from one end portion of said first casing to another end portion of said first casing in a first row;
a light receiving unit having an elongated second casing along a longitudinal direction of said second casing and a corresponding number of light receiving elements as the number of the light emitting elements being equally spaced from each other from one end portion of said second casing to another end portion of said second casing in a second row;
a light emitting circuit installed into said light emitting unit for driving said light emitting elements forming optical axes; a light receiving circuit installed into said light receiving unit for processing a first signal from said light receiving elements forming said optical axes with said light emitting elements; a status output means for outputting a binary signal corresponding to each of a first status being a light through status to all of the optical axes and a second status being a light blocked status to at least one optical axis based on a second signal from said light receiving circuit;
a diagnosis means for diagnosing a malfunction of said light emitting circuit, said light receiving circuit and said status output means;
an indicating portion disposed at each of said light emitting and receiving units comprising a plurality of indicating elements being in the same row of each of said light emitting and receiving elements with no-interference to each of said light emitting and receiving elements;
an indicating control portion for turning on said plurality of said indicating elements of said indicating portion as a first turn on pattern to show said first and second rows of said units when said binary signal indicating said first status is output by said status output means and turning on with a predetermined turn on pattern being different from said first turn on pattern when it is diagnosed said malfunction by said diagnosis means.

2. A multi-optical axis photoelectric sensor according to claim 1, wherein each of said light emitting and receiving units has a plurality of optical axis modules connected to each other, and each optical axis module includes at least two light emitting or receiving elements and has at least one of said indicating element of said indicating portion.

3. A multi-optical axis photoelectric sensor according to claim 2, wherein the number of said indicating element of said indicating portion corresponding to each of said optical axis module is smaller than the number of said light emitting or receiving elements installed into each of said light emitting and receiving units.

4. A multi-optical axis photoelectric sensor according to claim 1, wherein each of said light emitting and receiving units has a plurality of optical axis modules connected to each other, and each optical axis module includes at least one light emitting or receiving elements and each optical axis module disposed at the both ends of said casing has at least one of said indicating element of said indicating portion.

5. A multi-optical axis photoelectric sensor according to claim 4, wherein said casing has a closed end portion at the each end of said elongated casing and an outermost light emitting or receiving element installed into said optical axis module disposed at the end of said casing is disposed between said closed end portion and said indicating element installed into said optical axis module disposed at the end of said casing.

6. A multi-optical axis photoelectric sensor according to claim 5, wherein said casing comprises an end casing disposed at each of the both end of said casing and an intermediate casing disposed between the both end casings, and said outermost light emitting or receiving element and said indicating element installed into said optical axis module disposed at the end of said casing are disposed at each of the both end casings.

7. A multi-optical axis photoelectric sensor according to claim 1, wherein each of said light emitting and receiving units has a plurality of optical axis modules connected to each other, and each optical axis module includes at least one light emitting or receiving elements and at least one of said indicating element of said indicating portion.

8. A multi-optical axis photoelectric sensor according to claim 7, wherein said indicating elements disposed on said row are approximately equally spaced from each other.

9. A multi-optical axis photoelectric sensor according to claim 1, wherein said status output means has a normal mode for outputting a binary signal corresponding to each of a first status being a light through status to all of the optical axes and a second status being a light blocked status to at least one optical axis based on a second signal from said light receiving circuit and a mute mode for outputting a binary signal corresponding to said first status regardless of the status of the optical axes and said indicating control portion for turning on said plurality of said indicating elements of said indicating portion to show said first and second rows of said units when said binary signal indicating said first status is output by said status output means in said normal mode, and for indicating said mute mode at said indicating portion in said mute mode.

10. A multi-optical axis photoelectric sensor comprising:
a light emitting unit having an elongated first casing along a longitudinal direction of said first casing and a plurality of light emitting elements being equally spaced from each other from one end portion of said first casing to another end portion of said first casing in a first row;

a light receiving unit having an elongated second casing along a longitudinal direction of said second casing and a corresponding number of light receiving elements as the number of the light emitting elements being equally spaced from each other from one end portion of said second casing to another end portion of said second casing in a second row;

a light emitting circuit installed into said light emitting unit for driving said light emitting elements forming an optical axes;

a light receiving circuit installed into said light receiving unit for processing a first signal from said light receiving elements forming said optical axes with said light emitting elements;

a status output means for outputting a binary signal corresponding to each of a first status being a light through status to all of the optical axes and a second status being a light blocked status to at least one optical axis based on a second signal from said light receiving circuit;

a diagnosis means for diagnosing a malfunction of said light emitting circuit, said light receiving circuit and said status output means;

a first indicating portion disposed at each of said light emitting and receiving units comprising a plurality of first indicating elements being in the same row of each of said light emitting and receiving elements with no-interference to each of said light emitting and receiving elements;

a second indicating portion disposed at one of said light emitting and receiving units and comprising a plurality of second indicating elements being out of said same row of one of said light emitting and receiving elements of said units having said second indicator portion with no-interference to one of said light emitting and receiving elements of said units having said second indicator portion and an indicating control portion for turning on said plurality of said first indicating elements of said first indicating portion to show said first and second rows of said units when said binary signal indicating said first status is output by said status output means and indicating a result of said diagnosis based on said diagnosis means with a predetermined turn-on pattern of said plurality of said second indicating elements of said second indicating portion when said malfunction is diagnosed by said diagnosis means.

11. A multi-optical axis photoelectric sensor according to claim 10, wherein each of said light emitting and receiving units has a plurality of optical axis modules connected to each other, and each optical axis module includes at least two light emitting or receiving elements and has at least one of said first indicating element of said first indicating portion.

12. A multi-optical axis photoelectric sensor according to claim 11, wherein the number of said first indicating element of said first indicating portion corresponding to each of said optical axis module is smaller than the number of said light emitting or receiving elements installed into each of said light emitting and receiving units.

13. A multi-optical axis photoelectric sensor according to claim 10, wherein each of said light emitting and receiving units has a plurality of optical axis modules connected to each other by way of a first communication line, and each of said optical axis module includes at least one light emitting or receiving elements, and each of said light emitting and receiving units has a plurality of indicating modules, and each of said indicating module has said first indicating portion, and the number of said indicating modules is smaller than the number of said optical axis modules and each of said light emitting and receiving units has a second communication line connected between a plurality of said indicating modules.

14. A multi-optical axis photoelectric sensor according to claim 10, wherein each of said light emitting and receiving units has a first optical axis module having at least one light emitting or receiving element and said first indicating element of said first indicating portion and a second axis module having at least one light emitting or receiving element.

15. A multi-optical axis photoelectric sensor according to claim 10, wherein each of said light emitting and receiving units has a plurality of optical axis modules connected to each other, and each optical axis module includes at least one light emitting or receiving elements and each optical axis module disposed at the both ends of said casing has at least one of said first indicating element of said first indicating portion.

16. A multi-optical axis photoelectric sensor according to claim 15, wherein said casing has a closed end portion at each end of said elongated casing; and an outermost light emitting or receiving element is installed into said optical axis module disposed at the end of said casing, and is installed between said closed end portion and said first indicating element installed into said optical axis module.

17. A multi-optical axis photoelectric sensor according to claim 16, wherein said casing comprises an end casing disposed at both of the ends of said casing and an intermediate casing disposed between both end casings; and said outermost light emitting or receiving element and said first indicating element, which is installed into said optical axis module disposed at the end of said casing, are disposed at both of the end casings.

18. A multi-optical axis photoelectric sensor according to claim 10, wherein each of said light emitting and receiving units has a plurality of optical axis modules connected to each other, and each optical axis module includes at least one light emitting or receiving elements and at least one of said first indicating element of said first indicating portion.

19. A multi-optical axis photoelectric sensor according to claim 18, wherein said first indicating elements disposed on said row are approximately equally spaced from each other.

20. A multi-optical axis photoelectric sensor according to claim 10, wherein said status output means has a normal mode for outputting a binary signal corresponding to each of a first status being a light through status to all of the optical axes and a second status being a light blocked status to at least one optical axis based on a second signal from said light receiving circuit and a mute mode for outputting a binary signal corresponding to said first status regardless of the status of the optical axes and said indicating control portion for turning on said plurality of said first indicating elements of said first indicating portion to show said first and second rows of said units when said binary signal indicating said first status is output by said status output means and indicating said first status to show said first and second rows of said units at said second indicating portion as said output of said status output means in said normal mode, and for turning on said plurality of said first indicating elements of said first indicating portion as the same to said binary signal indicating said first status being output in said normal mode and indicating said mute mode and said output status of said status output means at said second indicating portion in said mute mode.

* * * * *

UNITED STATES PATENT AND TRADEMARK OFFICE
CERTIFICATE OF CORRECTION

| | |
|---|---|
| PATENT NO. | : 7,485,841 B2 |
| APPLICATION NO. | : 12/018839 |
| DATED | : February 3, 2009 |
| INVENTOR(S) | : Inoue et al. |

It is certified that error appears in the above-identified patent and that said Letters Patent is hereby corrected as shown below:

IN THE DRAWING:

Sheet 4 of 10, Fig. 4A and Fig. 4B are to be replaced with attached Fig. 4A and Fig. 4B.

Signed and Sealed this

Seventh Day of April, 2009

JOHN DOLL
*Acting Director of the United States Patent and Trademark Office*